US012569394B2

(12) United States Patent
Zhong

(10) Patent No.: US 12,569,394 B2
(45) Date of Patent: Mar. 10, 2026

(54) RECIPROCATING LINEAR MOVEMENT MASSAGING APPARATUS

(71) Applicant: ODECO LTD., Guangdong (CN)

(72) Inventor: Huiming Zhong, Guangdong (CN)

( * ) Notice: Subject to any disclaimer, the term of this patent is extended or adjusted under 35 U.S.C. 154(b) by 1232 days.

(21) Appl. No.: 17/426,061

(22) PCT Filed: Jul. 1, 2020

(86) PCT No.: PCT/CN2020/099692
§ 371 (c)(1),
(2) Date: Jul. 27, 2021

(87) PCT Pub. No.: WO2021/174733
PCT Pub. Date: Sep. 10, 2021

(65) Prior Publication Data

US 2022/0313535 A1 Oct. 6, 2022

(30) Foreign Application Priority Data

Jun. 9, 2020 (CN) ........................ 202021061896.1

(51) Int. Cl.
*A61H 7/00* (2006.01)

(52) U.S. Cl.
CPC ..... *A61H 7/004* (2013.01); *A61H 2201/1215* (2013.01); *A61H 2201/149* (2013.01); *A61H 2201/1669* (2013.01); *A61H 2201/5058* (2013.01)

(58) Field of Classification Search
CPC ... A61H 23/02; A61H 23/006; A61H 23/0218
See application file for complete search history.

(56) References Cited

U.S. PATENT DOCUMENTS

| | | | | |
|---|---|---|---|---|
| 2,076,410 A * | 4/1937 | McGerry | A61H 9/005 | 601/7 |
| 2,154,428 A * | 4/1939 | Andres | A61H 23/0218 | 601/81 |
| 4,512,339 A * | 4/1985 | McShirley | H02K 33/02 | 310/23 |
| 7,144,417 B2 * | 12/2006 | Colloca | H01F 7/18 | 601/111 |
| 11,596,574 B2 * | 3/2023 | Pahl | A61H 19/34 | |
| 2019/0159961 A1 * | 5/2019 | Chuang | A61H 1/00 | |

* cited by examiner

*Primary Examiner* — LaToya M Louis
(74) *Attorney, Agent, or Firm* — David & Raymond Patent Firm; Raymond Y Chan

(57) ABSTRACT

A reciprocating linear movement massaging apparatus, having a shell, a massaging assembly provided in the shell, a driving mechanism for driving the massaging assembly to perform reciprocating linear movement axially along the shell, and an electric control device for controlling the driving mechanism; the driving mechanism comprises a stator assembly and a mover assembly, an air gap is provided between the stator assembly and the mover assembly; the stator assembly comprises (an) annular coil(s) provided in the shell, the mover assembly comprises a plurality of magnets provided in the annular coil(s), the plurality of magnets enclose to be an annular magnet; the annular magnet is transmissively connected with the massaging assembly and the massaging assembly is located in an annular space enclosed by the annular magnet, and an open cavity is provided in the massaging assembly for receiving a human part to be massaged.

10 Claims, 3 Drawing Sheets

RECIPROCATING LINEAR MOVEMENT MASSAGING APPARATUS

TECHNICAL FIELD

The present invention relates to massaging appliance technical field, especially to a reciprocating linear movement massaging apparatus

BACKGROUND TECHNOLOGY

With acceleration of rhythm of life, working pressure is increasingly great, and one becomes very tired after a day of anxious work. To relax tiredness and stay mentally and physically healthy, massaging apparatus, such as reciprocating linear movement massaging apparatus, are used to massage parts of bodies.

Conventional reciprocating linear movement massaging apparatus comprise a rotation motor, an intermediate transmission mechanism and a massaging member, the intermediate transmission mechanism transmits rotational movement of the rotation motor to be linear movement to drive the massaging member against human parts to be massaged, and body massaging is done. However, as it is necessary to include a motor and an intermediate transmission mechanism in the reciprocating linear movement massaging apparatus, size of the reciprocating linear movement massaging apparatus currently available is usually very big, and a lot of noise is generated during using the same, so user experience is deteriorated.

SUMMARY OF THE INVENTION

A purpose of the present invention is to provide a reciprocating linear movement massaging apparatus, aiming to address technical deficiencies with existing reciprocating linear movement massaging apparatus such as being very big and noisy.

To realize the foregoing purpose, the present invention proposes a reciprocating linear movement massaging apparatus, comprising a shell, a massaging assembly provided in the shell, a driving mechanism for driving the massaging assembly to perform reciprocating linear movement axially along the shell, and an electric control device for controlling the driving mechanism; the driving mechanism comprises a stator assembly and a mover assembly, an air gap is provided between the stator assembly and the mover assembly; the stator assembly comprises (an) annular coil(s) provided in the shell, the mover assembly comprises a plurality of magnets provided in the annular coil(s), the plurality of magnets enclose to be an annular magnet; the annular magnet is transmissively connected with the massaging assembly and the massaging assembly is located in an annular space enclosed by the annular magnet, and an open cavity is provided in the massaging assembly for receiving a human part to be massaged.

Preferably, the stator assembly comprises coil supports provided in the shell for winding the annular coil(s).

Preferably, the stator assembly comprises a first magnetic conduction piece joined to the annular coil(s).

Preferably, the mover assembly comprises a magnet support provided in the shell, and (a) second magnetic conduction piece(s) provided on either end or both ends of the annular magnet, the magnet support is joined to an inner side of the annular magnet, and is provided to be hollow inside, and the massaging assembly is provided in the magnet support and connected with the magnet support.

Preferably, the massaging assembly comprises a fixing seat and a flexible massaging member connected with the fixing seat, the massaging assembly is connected to the magnet support by the fixing seat and the open cavity is provided in the flexible massaging member.

Preferably, a first magnet is provided at a bottom part of the magnet support, and a second magnet or a magnetically absorption member that engages with the first magnet by magnetic absorption is provided in a bottom part of the fixing seat.

Preferably, the reciprocating linear movement massaging apparatus further comprises (a) sensor(s) for detecting the mover assembly.

Preferably, the reciprocating linear movement massaging apparatus further comprises a heat dissemination and insulation cover provided outside the annular coil(s).

Preferably, a thickness of the annular coil(s) is 0.6 to 4.2 mm.

Preferably, a thickness of the annular magnet is 0.5 to 15 mm.

Preferably, the air gap between the stator assembly and the mover assembly is 0.05 to 1.2 mm.

Compared with the prior art, embodiments of the present invention have following beneficial effects:

In the reciprocating linear movement massaging apparatus provided by the embodiments of the present invention, by applying alternating and changing current to the stator assembly (the annular coil(s)) with the electric control device, varying magnetic field is generated, and in the varying magnetic field, the mover assembly (the annular magnet) makes reciprocating linear movement in the air gap. As the massaging assembly is connected with the mover assembly, the massaging assembly, driven by the mover assembly, will make reciprocating linear movement in the air gap, so as to realize human part massaging. When massaging is desired, orient an open end of the massaging assembly towards a body part to be massaged, press the power button, the driving mechanism can be started, so as to drive the massaging assembly with the driving mechanism to impact repeatedly the part to be massaged. Compared with existing reciprocating linear movement massaging apparatus, the reciprocating linear movement massaging apparatus provided by the embodiments of the present invention is smaller and lighter as it is not necessary to install a rotation motor and an intermediate transmission mechanism, in the meantime, noise generated during running the reciprocating linear movement massaging apparatus is reduced, so user experience is improved. Furthermore, as the massaging assembly is provided in the annular space enclosed by the annular magnet, an entire length of the reciprocating linear movement massaging apparatus is shortened, so as to further reduce volume of the reciprocating linear movement massaging apparatus.

EMBODIMENTS

Figure 1:
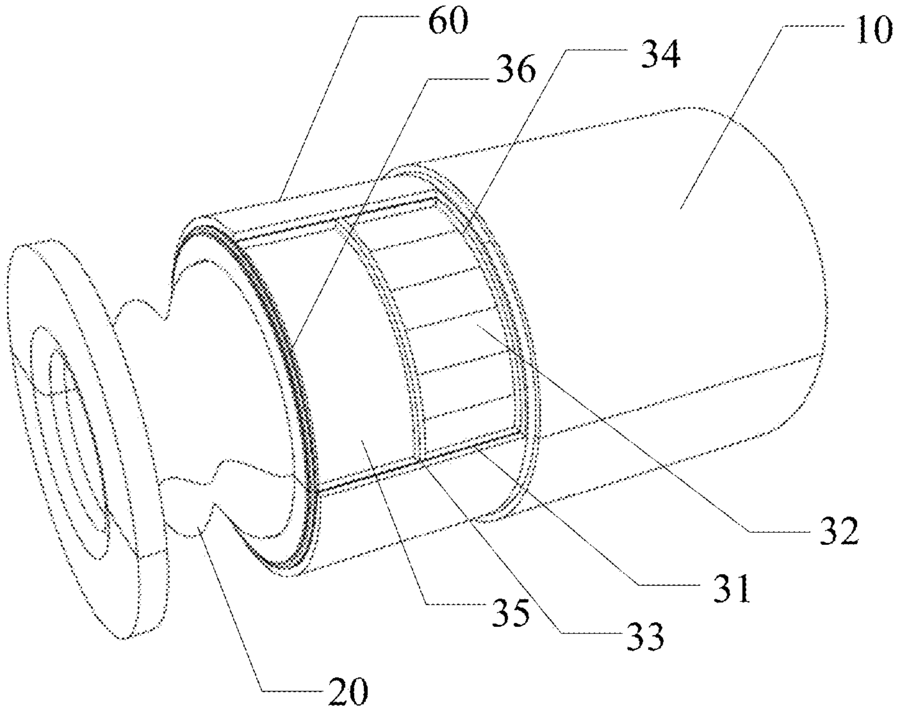
FIG. 1 is a structural diagram showing an embodiment of the reciprocating linear movement massaging apparatus according to the present invention.

The embodiments of the present invention are described in detail below. Examples of the embodiments are shown in the accompanying drawings, in which the same or similar reference numerals indicate the same or similar elements or elements with the same or similar functions. The embodiments described below with reference to the drawings are exemplary and are intended to explain the present invention, but cannot be understood as a limitation to the present invention. Based on the embodiments of the present invention, all other embodiments obtained by those of ordinary skill in the art without making any creative labor belong to the scope of protection of the present invention.

Figures 1, 2:
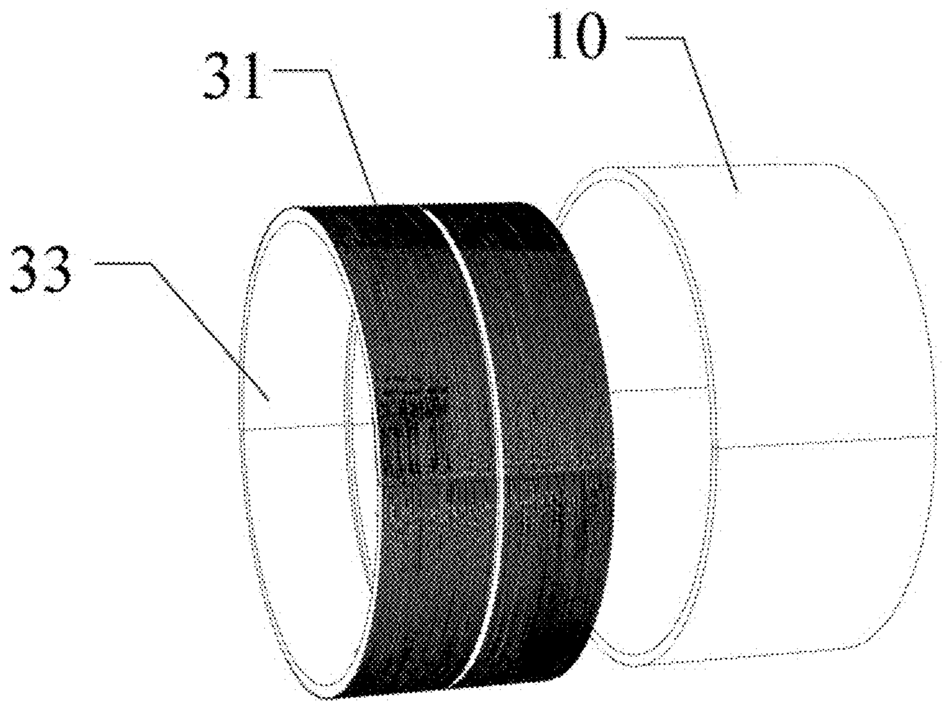
FIG. 2 is an exploded structural view of the reciprocating linear movement massaging apparatus according to the present invention.
Figure 2:
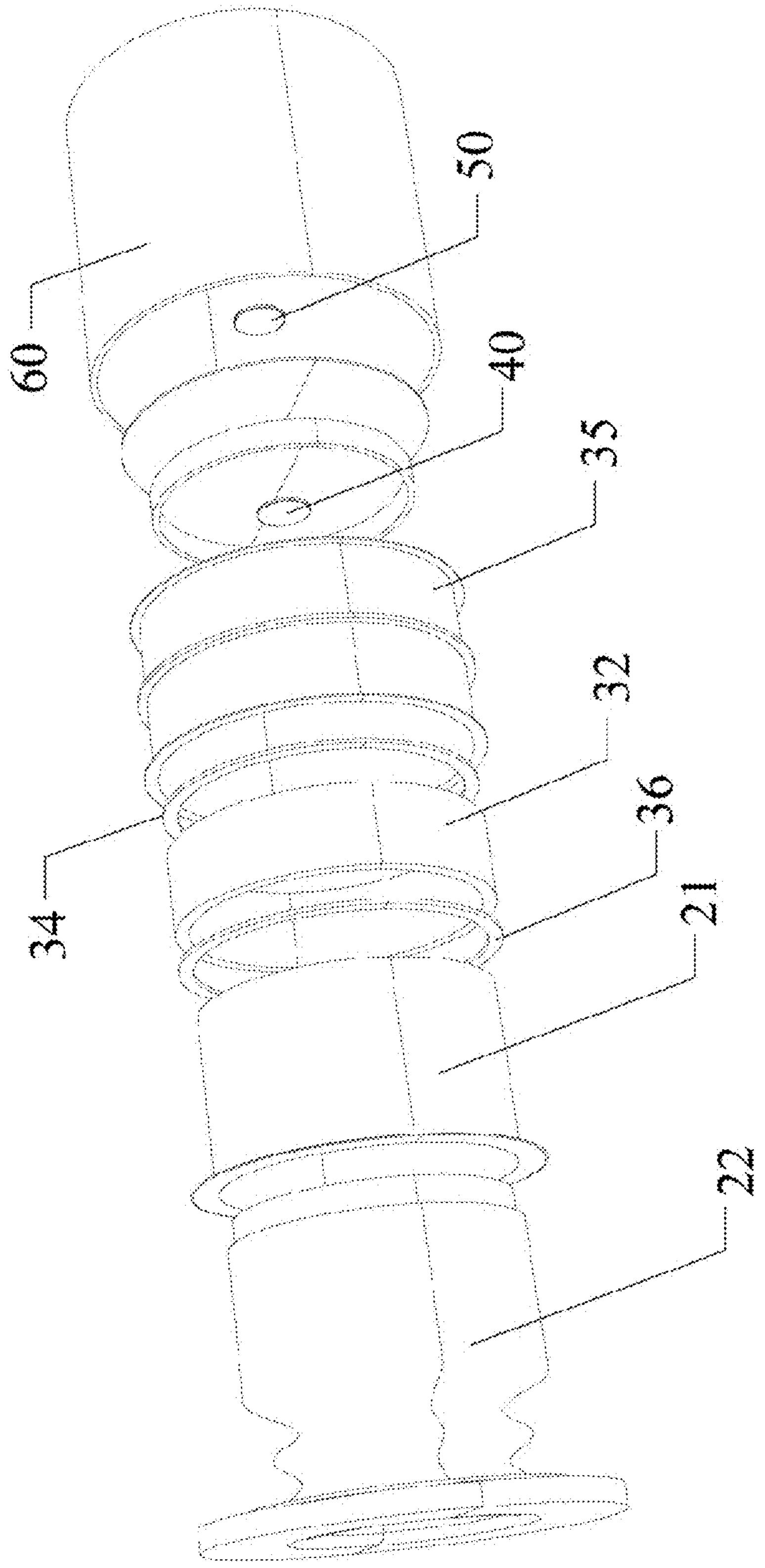

Embodiments of the present invention provide a reciprocating linear movement massaging apparatus, in an embodiment of the present invention, as shown in FIG. 1 and FIG. 2, the reciprocating linear movement massaging apparatus comprises a shell 10, a massaging assembly 20 provided in the shell 10, a driving mechanism provided for driving the massaging assembly 20 to perform reciprocating movement axially along the shell 10 and an electric control device for controlling the driving mechanism; the driving mechanism comprises a stator assembly and a mover assembly, the stator assembly comprises (an) annular coil(s) 31 provided in the shell 10, the mover assembly comprises magnets provided in the annular coil(s) 31, the magnets are enclosed to form an annular magnet 32; the annular magnet 32 is transmissively connected with the massaging assembly 20, and a part of the massaging assembly 20 is provided in an annular space enclosed by the annular magnet 32, and an open cavity is provided in the massaging assembly for receiving a human part to be massaged.

A role of the shell 10 in embodiments of the present invention is to house the massaging assembly 20, the driving mechanism and the electric control device etc., in an embodiment of the present invention, the shell 10 is configured to be a tubular structure hollow inside with one end open, so a user can hold the reciprocating linear movement massaging apparatus with a hand. It is to be noted that, the tubular structure of the shell 10 is only exemplary, rather than restrictive, and those skilled in the art can set the shell 10 according to actual usage conditions. The shell 10 can be made of plastic materials, and can also be made of metal sheets, which is included but not limited thereto, those skilled in the art can choose as per actual usage conditions. It is comprehensible to provide skidding proof structures on the shell 10 to prevent falling off of the reciprocating linear movement massaging apparatus when being held in hand by the user, the skidding proof structures can be such as skid proof projections and skid proof grooves, which are included but not limited thereto.

A role of the stator assembly provided in embodiments of the present invention is to generate a varying magnetic field when energized, and the magnetic field generated by the stator assembly interacts with a magnetic field generated by the mover assembly, so as to form a magnetic force to drive the massaging assembly 20 to move reciprocally and axially along the shell 10. It is to be noted that, the stator assembly provided in embodiments of the present invention is not movable, while the mover assembly can make reciprocal linear movement under action of the magnetic force, to drive the massaging assembly 20 to impact reciprocally the human part to be massaged. The stator assembly comprises primarily an annular coil 31 to generate a varying magnetic field when energized, the annular coil 31 is fixed in advance by glue, or wound around a tubular support, which those skilled in the art can adjust as per actual application situations. The annular coils 31 can be provided to be more than one, by exerting electric current on the annular coils 31, magnetic force of different magnitudes can be generated, to control the massaging assembly 20 to perform reciprocal linear movements in different strokes. For example, there can be two annular coils 31 in the reciprocating linear movement massaging apparatus in the present invention, when current is exerted only on a first annular coil, the massaging assembly 20 is controlled to perform reciprocal linear movement in a first travelling stroke, and when current is exerted of both the annular coils 31, the massaging assembly 20 is controlled to perform reciprocal linear movement in a second travelling stroke, it is comprehensible that the second travelling stroke is bigger than the first travelling stroke. The mover assembly comprises mainly of magnets for generating magnetic fields spontaneously, the magnets enclose to be an annular magnet 32, and the annular magnet 32 will generate a magnetic field in the shell 10, which will interact with the magnetic field generated by the stator assembly to produce a magnetic force. It shall be noted that, the annular magnet 32 can be integrally provided or spliced by several individual magnet pieces; the several magnetic pieces can be continuous or discontinuous. Preferably, an axial length of the annular coil 31 is at least 1.5 times of an axial length of the annular magnet 32, and no limitation will be on concrete configurations of the annular coil 31 and the annular magnet 32, which those skilled in the art can design according to actual conditions.

A role of the massaging assembly 20 provided in embodiments of the present invention is to contact the human part to be massaged, so as to impact reciprocally the human part to be massaged driven by the mover assembly and achieve massaging effects. The massaging assembly 20 is to contact human directly, and to promise massaging comfort, a part of the massaging assembly 20 that contacts human is provided to be made from soft flexible materials.

Working principles of the reciprocating linear movement massaging apparatus according to the present invention: during use, by starting the power, alternating and changing current is exerted on the stator assembly, upon exertion of the alternating and changing current, the annular coil 31 will generate a varying magnetic field; the magnetic field generated by the stator assembly will interact with the magnetic field generated by the mover assembly, so as to generate a magnetic force to drive the mover assembly to move axially along the shell 10; as the massaging assembly 20 is connected with the mover assembly, reciprocal movement of the mover assembly will drive reciprocating movement of the massaging assembly 20 in the shell 10, so as to achieve massaging effects.

The reciprocating linear movement massaging apparatus according to the present invention, exerts alternating and changing current on the stator assembly (the annular coil 31) with the electric control device, to generate a varying magnetic field, so that the mover assembly (the annular magnet 32) in the varying magnetic field will make reciprocal linear movement in the air gap under action of the magnetic force. As the massaging assembly 20 is connected with the mover assembly, the massaging assembly 20, driven by the mover assembly, will make reciprocal linear movement in the air gap, so as to realize massaging of human parts. When massaging is desired, orient an open end of the massaging assembly 20 against the part to be massaged, press the power button, the driving mechanism is started, so as to drive the massaging assembly 20 to impact the part to be massaged reciprocally. Compared with existing reciprocating linear movement massaging apparatus, the reciprocating linear movement massaging apparatus provided by the embodiments of the present invention is smaller and lighter as it is not necessary to install a rotation motor and an intermediate transmission mechanism, in the meantime, noise generated during running the reciprocating linear movement massaging apparatus is reduced, so user experience is improved. Furthermore, as the massaging assembly 20 is provided in the annular space enclosed by the annular magnet 32, an entire length of the reciprocating linear movement massaging apparatus is shortened, so as to further reduce volume of the reciprocating linear movement massaging apparatus.

In an embodiment of the present invention, the stator assembly provided by the present invention further comprises a coil support 33 provided in the shell 10 for winding the annular coil 31, and a first magnetic conduction piece 34 joined on the annular coil 31. In the present embodiment, the coil support 33 is a hollow tubular structure, the annular coil 31 is wound outside the coil support 33, and the annular magnet 32 is provided inside the hollow coil support 33, so that when the annular coil 31 on the coil support 33 is energized, a magnetic force driving the massaging assembly 20 to make reciprocal linear movement axially along the shell 10 by interaction of the magnetic field generated upon energization of the annular coil 31 and the magnetic field spontaneously generated by the annular magnet 32 is generated. To ensure a maximum utilization of the magnetic fields generated in the shell 10, the stator assembly provided by the present invention further comprises a first magnetic conduction piece 34 joined on the annular coil 31, so as to conduct the magnetic field generated with the first magnetic conduction piece 34 and avoid attenuation of the magnetic field during conduction. Undoubtedly, the first magnetic conduction piece 34 is made from magnetic conduction materials, such as iron, in an embodiment, the first magnetic conduction piece 34 proposed in the present invention is a soft magnetic conduction iron ring, which is included however not limited thereto, the first magnetic conduction piece 34 can be made from other magnetic conduction materials, apparently, structure of the first magnetic conduction piece 34 can be altered as per actual conditions, just to realize a magnetic conduction function.

In another embodiment of the present invention, the mover assembly proposed by the present invention comprises a magnet support 35 and (a) second magnetic conduction piece(s) 36 provided on either end or both ends of the annular magnet 32, the magnet support 35 is joined to an inner side of the annular magnet 32 and is hollow inside, and a part of the massaging assembly 20 is located in the magnet support 35 and connected with the magnet support 35. In the present embodiment, the magnet support 35 is a hollow tubular structure, with the annular magnet 32 provided outside the magnet support 35 and the massaging assembly 20 provided inside the magnetic support 35, a hollow cavity in the magnet support 35 is used to house the massaging assembly 20, so as to reduce an axial length of the reciprocating linear movement massaging apparatus proposed by the present invention and reduce overall volume of the reciprocating linear movement massaging apparatus. To utilize the magnetic fields in the shell 10 to a maximum degree, the mover assembly proposed by the present invention further comprises a second magnetic conduction piece 36 provided on an end of the annular magnet 32, so as to conduct the magnetic field generated with the second magnetic conduction piece 36, and avoid attenuation of the magnetic field during conduction. Undoubtedly, the second magnetic conduction piece 36 is made from magnetic conduction materials, such as iron, in an embodiment, the second magnetic conduction piece 36 is a soft magnetic conduction iron ring, which is included but not limited thereto, the second magnetic conduction piece 36 can be made of other magnetic conduction materials, and apparently, structures of the second magnetic conduction piece 36 can be altered according to actual situations, only to realize the magnetic conduction function. In conjunction with the first magnetic conduction piece 34 described in the foregoing embodiment, the reciprocating linear movement massaging apparatus proposed by the present invention can include only the first magnetic conduction piece 34, or include only the second magnetic conduction piece 36, or even include both the first magnetic conduction piece 34 and the second magnetic conduction piece 36, and in an embodiment, the reciprocating linear movement massaging apparatus proposed by the present invention comprises both the first magnetic conduction piece 34 and the second magnetic conduction piece 36.

In another embodiment of the present invention, the massaging assembly 20 proposed by the present invention further comprises a fixing seat 21 and a flexible massaging member 22 connected with the fixing seat 21, the massaging assembly 20 is connected with the magnet support 35 by the fixing seat 21, and an open cavity is provided in the flexible massaging member 22. In the present embodiment, the massaging assembly 20 comprises the fixing seat 21 and a massaging member, connection between the massaging member and the fixing seat 21 is detachable, such as thread connection, clearance fit and socket joining, when the massaging member or the fixing seat 21 is damaged, the damaged part can be disconnected to be replaced with a new one, without replacing the entire massaging assembly 20. It is comprehensible that, body parts of different users may be different in size, therefore, it is necessary to change the massaging members of different specifications and sizes, so as to satisfy different users, and improve utility of the reciprocating linear movement massaging apparatus according to the present invention.

In the foregoing another embodiment, a first magnet 40 is provided in a bottom part of the magnet support 35, and a second magnet 50 or a magnetic absorption piece that engages with the first magnet by magnetic absorption is correspondingly provided at a bottom part of the fixing seat 21. In the present embodiment, the massaging assembly 20 is connected with the mover assembly by magnets, which means two magnets are respectively provided at the bottom part of the magnet support 35 and the bottom part of the fixing seat 21, so as to fix the same with the two magnets, when to dissemble, it is only necessary to exert a force on the massaging assembly 20 to remove the massaging assembly 20 from the mover assembly, which is very convenient. Apparently, it is possible to provide only one magnet, and furnish the other with a metal piece, by absorbing the metal piece with the magnet the two can be fixed too.

In another embodiment, the reciprocating linear movement massaging apparatus according to the present invention further comprises (a) sensor(s) for detecting the mover assembly. In the present embodiment, detection signals can be sent to the electric control device by a sensor such as a proximity switch or a photoelectric switch, and the electric control device will in turn control reciprocal movement of the mover assembly according to the signals received. Specially, control can be done by “single point control” or “dual point control”, by “single point control”, only a corresponding sensor is provided on a beginning point or a terminal point of movement of the mover assembly, so as to transmit signals that the mover assembly has moved to the beginning point or the terminal point to the electric control device; by “dual point control”, corresponding sensors are provided on both the beginning point and the terminal point of the mover assembly, so as to transmit signals that the mover assembly has moved to the beginning point or the terminal point to the electric control device. Based on the "single point control" mode, a sensor in such as the beginning point of the mover assembly transmits signals to the electric control device, that is, the mover assembly starts to move outwards, at this time, it can be set that the mover assembly shall arrive at the terminal point in a certain time, such as 3 s; after moving for 3 s, the electric control device controls the mover assembly to move reversely, that is, the mover assembly starts to retract inwards. Based on the "dual point control" mode, detection signals from sensors provided on both the beginning point and the terminal point are used to control reciprocal movement of the mover assembly. Concrete configuration methods of the sensor(s) can be done as per actual situations, and the sensor(s) can be provided on the coil support 33, and can be provided on the magnet support 35 too.

In another embodiment, the reciprocating linear movement massaging apparatus provided by the present invention further comprises a heat dissemination and insulation cover 60 provided outside the annular coil 31. In the present embodiment, ferromagnetic materials of high magnetic conductivity are employed to make to be the insulation cover, so that magnetic fields of all directions pass along an inner wall of the materials, and no gauss is present in the cavity. Furthermore, the heat dissemination and insulation cover 60 can also disseminate heat, the heat dissemination and insulation cover 60 is provided to be of a hollow cylindrical shape, sleeved over the stator assembly, heat generated by the annular coil 31 can be disseminated by the heat dissemination and insulation cover 60. Specifically, the annular coil 31 contacts the heat dissemination and insulation cover 60, heat is transmitted by contact to the heat dissemination and insulation cover 60, and as the heat dissemination and insulation cover 60 is provided to be of hollow cylindrical shape, an contact area with the annular coil 31 is relatively big, which can speed up heat dissemination.

In another embodiment, a thickness of the annular coil 31 proposed by the present invention is 0.6-4.2 mm. it shall be understood that, the thickness of the annular coil 31 directly influences usage performance and user experience of the reciprocating linear movement massaging apparatus proposed by the present invention, specifically, when the thickness of the annular coil 31 is too big, total weight of the massaging apparatus is big too, which will deteriorate user experience; and in case the thickness of the annular coil 31 is too thin, the magnetic force generated will be insufficient, which will in turn degrade usage performance of the massaging apparatus. Therefore, after actual inspection, it is found that an optimum thickness of the annular coil 31 is 0.6 to 4.2 mm, which will bring the best usage performance and user experience.

In another embodiment, a thickness of the annular magnet 32 proposed by the present invention is 0.5-15 mm. in the present embodiment, the thickness of the annular magnet, just like the thickness of the annular coil 31, will influence the massaging apparatus to a great deal, when the annular magnet 32 is too thick, the user experience is deteriorated, and when the annular magnet 32 is too thin, usage performance of the massaging apparatus will be reduced. Therefore, upon actual test, an optimum thickness of the annular magnet is 0.5-15 mm. Preferably, the best thickness of the annular magnet 32 is 1.0-3.0 mm, which will in turn bring best usage performance and user experience.

In another embodiment, a radial air gap between the stator assembly and the mover assembly proposed by the present invention is 0.05-1.2 mm. In the present embodiment, a gap between the stator assembly and the mover assembly proposed by the present embodiment is called an air gap, and the air gap means an axial air gap and a radial air gap to promise axial reciprocal movement of the mover assembly along the shell 10, wherein the radial air gap is no smaller than 0.05 mm however no bigger than 1.2 mm, preferably, the radial air gap is no less than 0.1 mm but not bigger than 1.0 mm.

The foregoing are only some of the preferred embodiments of the present invention, neither the specification nor the drawings are therefore limiting the scope of protection of the present invention, and all equivalent replacements made based on contents of the specification and drawings of the present invention belonging to the concept of the present invention, or direct or indirect use of the present invention in other related technical field are covered in protection scope of the present invention.

The invention claimed is:

1. A reciprocating linear movement massaging apparatus, comprising a shell, a massaging assembly provided in the shell, a driving mechanism for driving the massaging assembly to perform reciprocating linear movement axially along the shell, and an electric control device for controlling the driving mechanism; the driving mechanism comprises a stator assembly and a mover assembly, an air gap is provided between the stator assembly and the mover assembly; the stator assembly comprises an annular coil provided in the shell, wherein the mover assembly comprises a plurality of magnets provided in the annular coil, the plurality of magnets enclose to be an annular magnet; the annular magnet is transmissively connected with the massaging assembly and the massaging assembly is located in an annular space enclosed by the annular magnet, and an open cavity is provided in the massaging assembly for receiving a human part to be massaged;

wherein the mover assembly comprises a magnet support provided in the shell, the massaging assembly comprises a fixing seat, a first magnet is provided at a bottom part of the magnet support, and a second magnet or a magnetically absorption member that engages with the first magnet by magnetic absorption is provided in a bottom part of the fixing seat.

2. The reciprocating linear movement massaging apparatus according to claim 1, wherein the stator assembly comprises a coil support provided in the shell for winding the annular coil.

3. The reciprocating linear movement massaging apparatus according to claim 1, wherein the stator assembly comprises a first magnetic conduction piece joined to the annular coil.

4. The reciprocating linear movement massaging apparatus according to claim 3, wherein the mover assembly comprises a second magnetic conduction piece provided on either end or both ends of the annular magnet, the magnet support is joined to an inner side of the annular magnet, and is provided to be hollow inside, and the massaging assembly is provided in the magnet support and connected with the magnet support.

5. The reciprocating linear movement massaging apparatus according to claim 1, wherein the massaging assembly comprises a flexible massaging member connected with the fixing seat, the massaging assembly is connected to the magnet support by the fixing seat and the open cavity is provided in the flexible massaging member.

6. The reciprocating linear movement massaging apparatus according to claim 1, further comprising a sensor for detecting the mover assembly.

7. The reciprocating linear movement massaging apparatus according to claim 1, further comprising a heat dissemination and insulation cover provided outside the annular coil.

8. The reciprocating linear movement massaging apparatus according to claim 1, wherein a thickness of the annular coil is 0.6 mm to 4.2 mm.

9. The reciprocating linear movement massaging apparatus according to claim 1, wherein a thickness of the annular magnet is 0.5 mm to 15 mm.

10. The reciprocating linear movement massaging apparatus according to claim 1, wherein the air gap between the stator assembly and the mover assembly is 0.05 mm to 1.2 mm.

* * * * *